(12) United States Patent
Lin

(10) Patent No.: US 6,782,804 B1
(45) Date of Patent: Aug. 31, 2004

(54) FRY PAN HAVING AN ADJUSTABLE POSITION ANGLE

(76) Inventor: Kenny Lin, 14D, Kang Sheng Loft, Chang Kang Garden, Chang Ping Town, Dongguan (CN)

( * ) Notice: Subject to any disclaimer, the term of this patent is extended or adjusted under 35 U.S.C. 154(b) by 0 days.

(21) Appl. No.: 10/694,804

(22) Filed: Oct. 29, 2003

(51) Int. Cl.[7] .............................. A23L 1/00; A47J 37/00
(52) U.S. Cl. .............................. 99/349; 99/372; 99/377; 99/380; 99/403; 99/422
(58) Field of Search ................. 99/339, 340, 349–351, 99/352–355, 403–417, 372–384, 422–425, 444–446, 327–332, 337, 385, 389–391, 400, 401; 219/524, 525, 521, 494, 496, 441, 442, 450.1, 451.1, 468.1, 468.2, 544; 126/25 R, 9 R, 41 R

(56) References Cited

U.S. PATENT DOCUMENTS

| | | | | |
|---|---|---|---|---|
| 723,654 A | * | 3/1903 | Curtiss | 432/225 |
| 1,661,294 A | * | 3/1928 | Lemaster | 99/376 |
| 1,672,299 A | * | 6/1928 | Boyd | 99/374 |
| 1,778,263 A | * | 10/1930 | Lamb | 99/339 |
| 1,901,314 A | * | 3/1933 | McArdle | 99/373 |
| 2,116,688 A | * | 5/1938 | Karl | 99/374 |
| 2,520,997 A | * | 9/1950 | Cavanagh | 99/372 |
| 4,088,067 A | * | 5/1978 | Kaebitzsch et al. | 99/379 |
| 4,967,650 A | * | 11/1990 | Weigle | 99/374 |
| 5,363,748 A | * | 11/1994 | Boehm et al. | 99/372 |
| 5,927,184 A | * | 7/1999 | Hermansson | 99/349 |
| 5,937,742 A | * | 8/1999 | Steeb et al. | 99/375 |
| 6,167,796 B1 | * | 1/2001 | Wright et al. | 99/332 |

* cited by examiner

Primary Examiner—Timothy F. Simone
(74) Attorney, Agent, or Firm—Bacon & Thomas, PLLC

(57) ABSTRACT

A fry pan with its position angle adjustable includes a body, a tightening device and a base. The body has an upper plate and a lower plate capable of being tightened by the tightening device. The body has a shaft and is pivotally connected to the base by the shaft. The base has a position device connected with the body. The body can be adjusted in its desired position angle by the shaft functioning as a pivot and then is tightened by the position device at the adjusted sloping angle for fat to flow down easily.

4 Claims, 7 Drawing Sheets

FRY PAN HAVING AN ADJUSTABLE POSITION ANGLE

BACKGROUND OF THE INVENTION

1. Field of the Invention

This invention relates to a fry pan, particularly to one having an adjustable position angle for fat seeping out of food to flow down and to be collected.

2. Description of Prior Art

Conventional fry pans used in most homes may not only waste time but also be not so suitable for properly cooking beefsteaks or pork chops, so special frypans for beefsteaks or pork chops have to be used. As people have high notion of preserving health, they may become more likely to choose food with good taste and high nutrition, hoping few ingredients unfavorable for health are contained in food. For example, meat should not contain too much fat for reducing cholesterol intake Then it is natural that people may demand proper frypans for cooking meat capable of removing as much fat as possible. Nowadays, most fry pans on the market are provided with simple holes or a sloped body to attain the objective. Nevertheless, meat to be cooked is usually positioned horizontally on a fry pan, which is not an effective position for removing fat.

There is another conventional frypan that uses a heater and a temperature controller positioned at one side, but the space for placing food on the fry pan is constant, so meat of different thickness being fried may have differently cooked condition in two surfaces of the meat resulting in a poorly cooked product having a bad outer appearance.

SUMMARY OF THE INVENTION

The objective of the invention is offer a fry pan with its position angle upwardly adjustable for a proper angle according to different meats so as to let fat in the meat to seep out during frying and guided to flow down for collection below the fry pan.

The feature of the invention is a fry pan of a body consisting of an upper plate and a lower plate with a pivot connected with a base and a position device combined with the base for swinging the fry pan up and down to a required angle for fat to easily flow down and away from the body.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
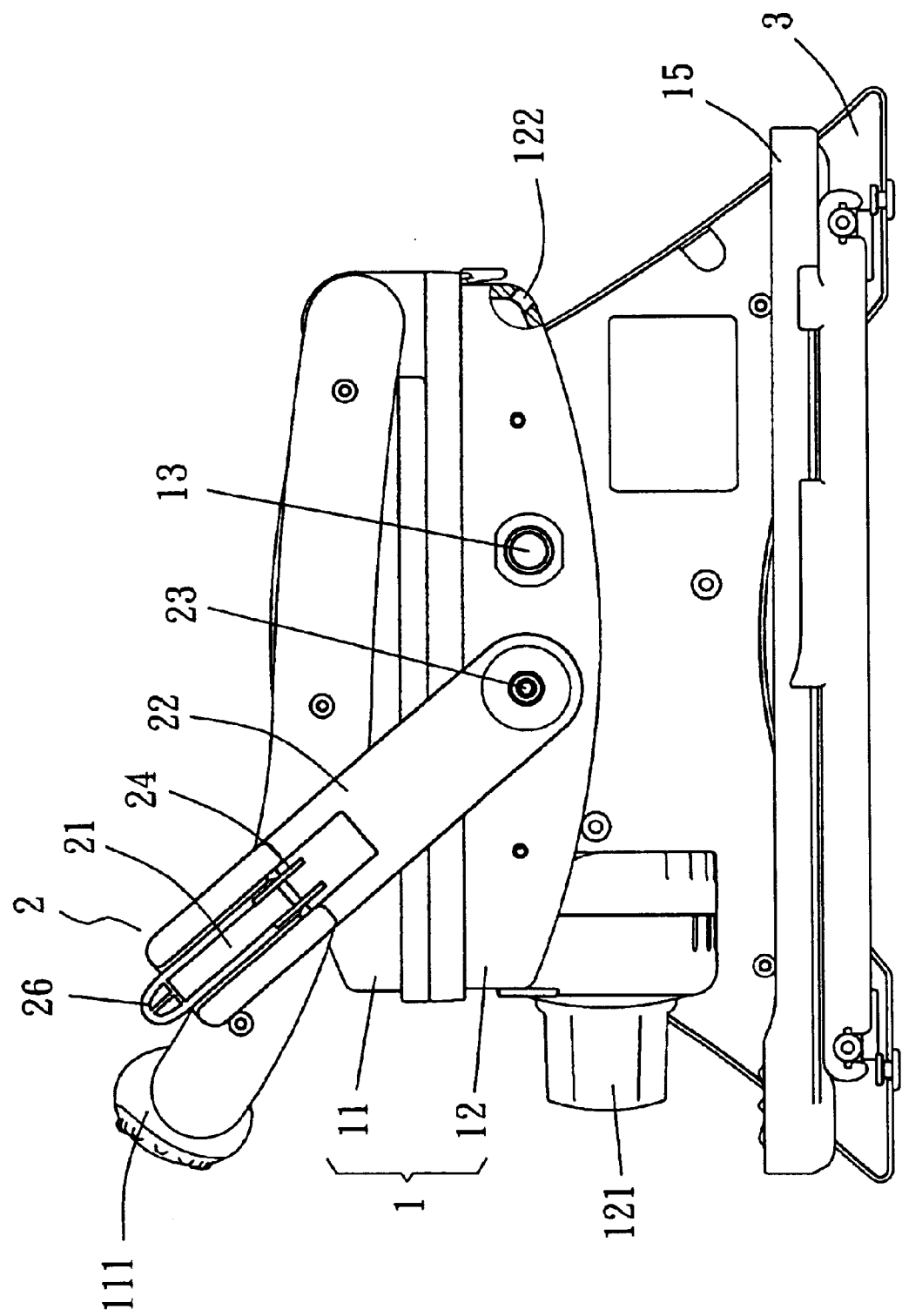
FIG. 1 is a side cross-sectional view of a fry pan with its position angle adjustable in the present invention.

A preferred embodiment of a fry pan with its position angle adjustable in the present invention, as shown in FIG. 1, includes a body 1, a tightening member 2, and a base 3 as main components.

Figure 4:
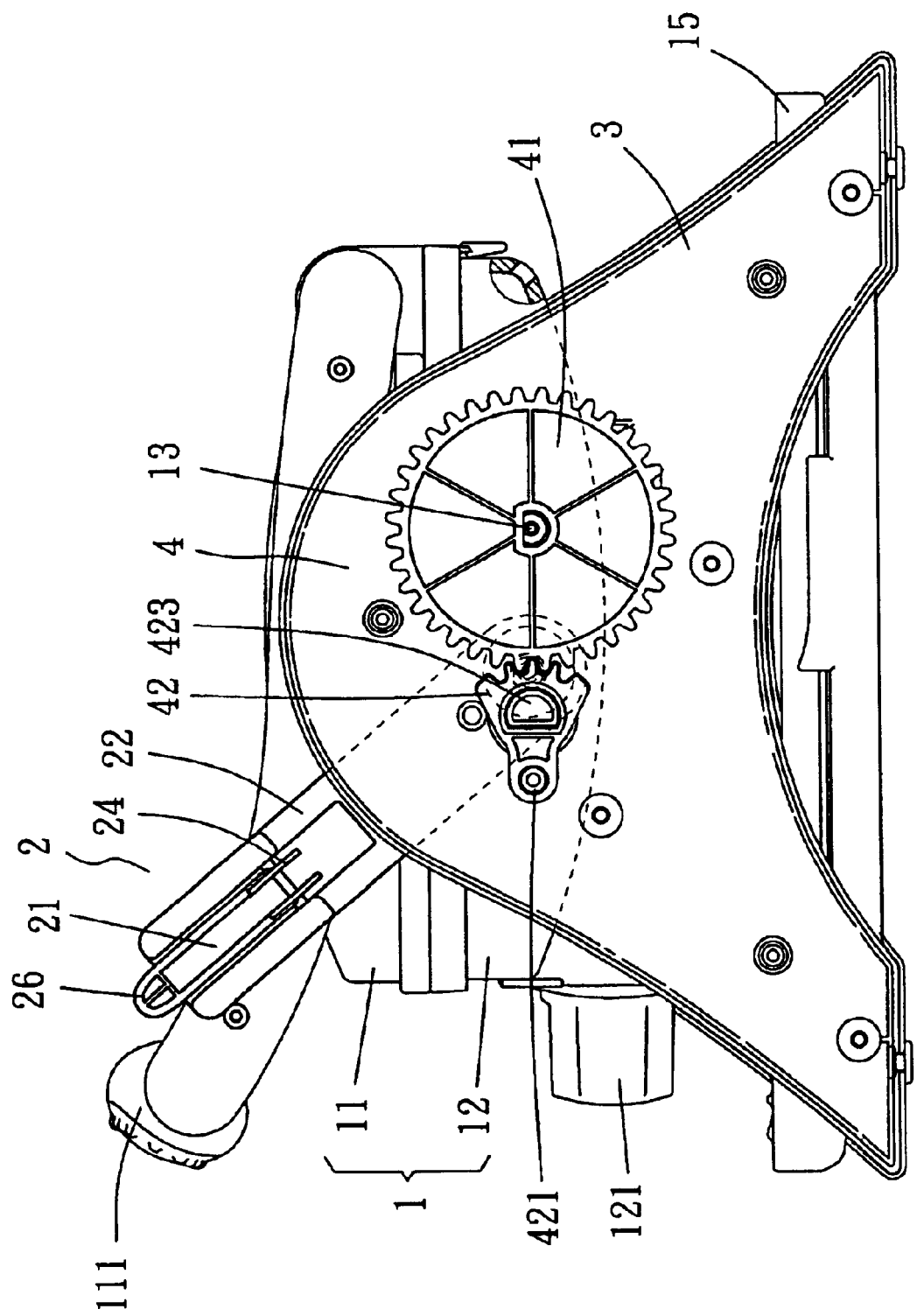
FIG. 4 is a side view of a position device in the present invention.

The body 1 consists of an upper plate 11 and a lower plate 12 and a heater with a temperature controller respectively, in the upper and lower plate 11 and 12. A timer 121 is fixed at an outer side of the lower plate 12 to control frying time. Further, a shaft 13 is provided in the body 1, pivotally combining the body 1 with the base 3. A position device 4 is fixed with the base 3, and connected with the body 1, as shown in FIG. 4. In order to let fat seeping out of meat flow down during frying, the body 1 can be swung up to a proper angle with the shaft 13, and the needed angle may be small for beefsteak with comparatively little fat, and be large for a pork chop with much fat.

The base 3 has the position device 4 fixed thereon, and the body 1 can be swung up to a proper angle and locked at that angle for frying. Fat seeping out of the meat may flow down under gravity along the lower plate 12, through a fat outlet 122 provided in the lower plate 12 and down into a collection disc 15 placed below the body 1.

Figure 2A:
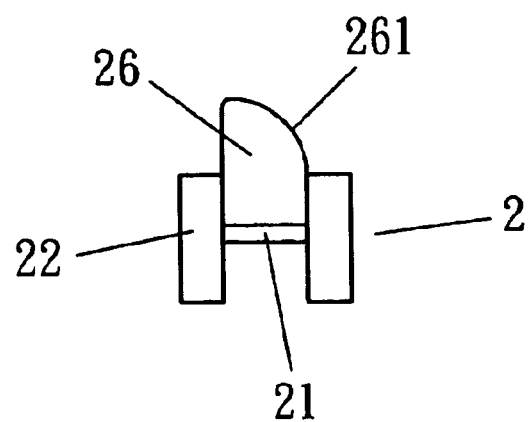
FIG. 2a is an upper view of the tightening member in the present invention.
Figure 2:
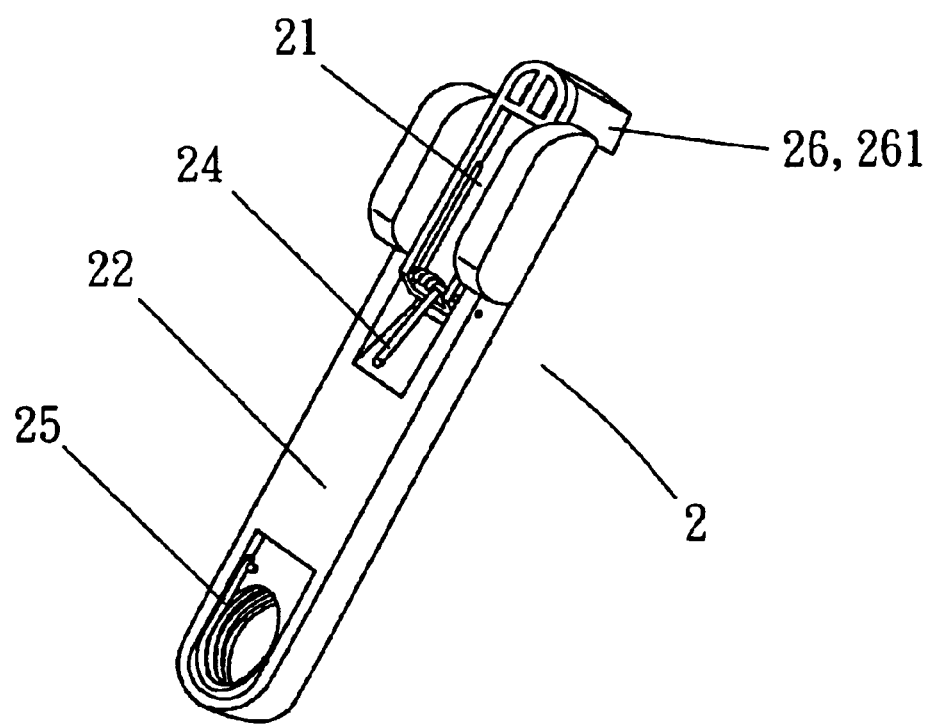
FIG. 2 is a perspective view of a tightening member in the present invention.
Figure 3:
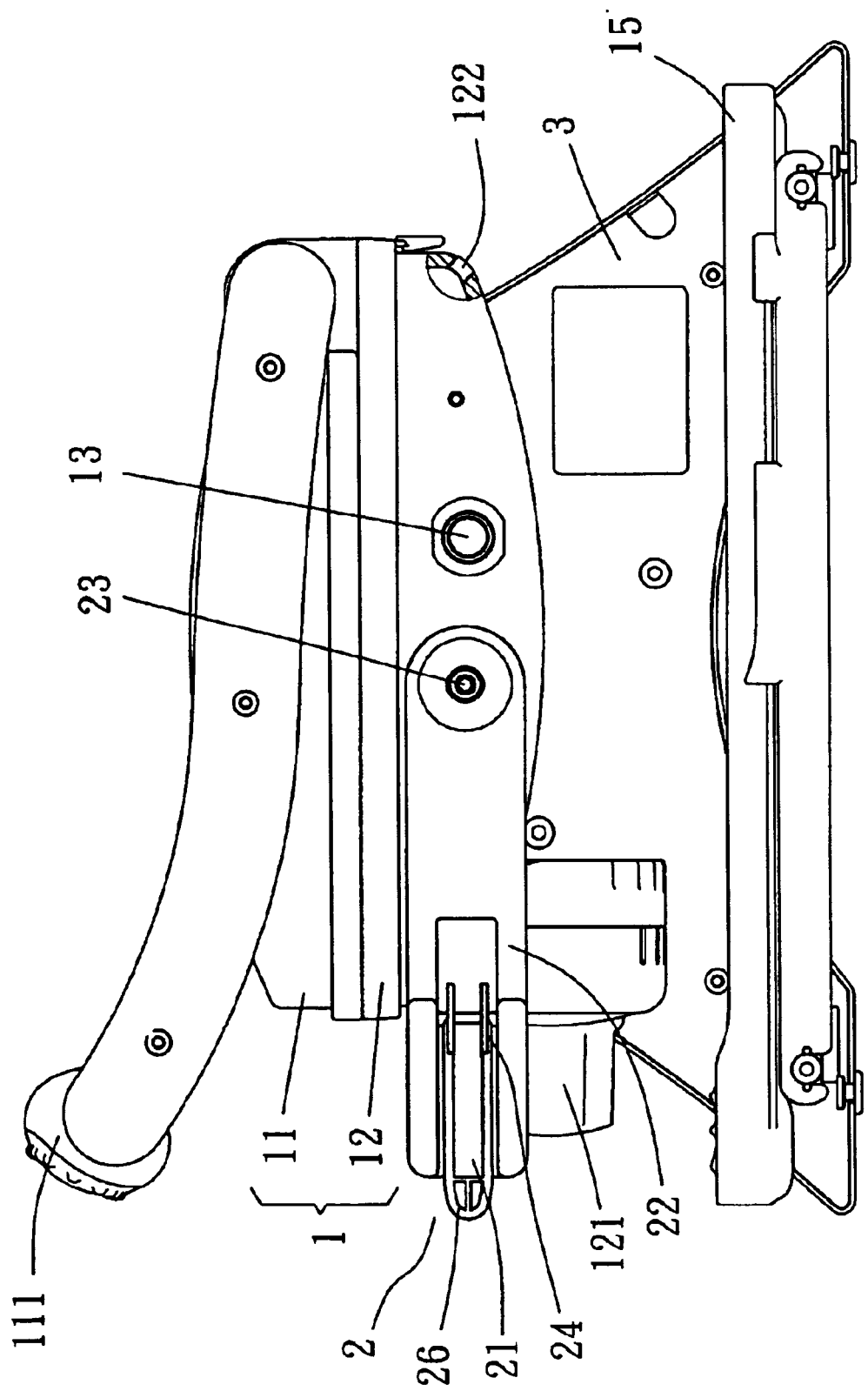
FIG. 3 is a side view of the fry pan with the tightening member loosened in the present invention.

The tightening member 2 has one end provided with a shaft 23 pivotally connected with a sidewall of the lower plate 12 and having an automatic force adjuster, and the other end compressing on the upper plate 11. As shown in FIG. 2, the tightening member 2 further has an elongate body 22 pivotally connected with the sidewall of the lower plate 12 as shown in FIG. 1, and a torque spring 25 fitted in the pivot hole for maintaining the tightening member 2 urging downwardly as shown in FIG. 3. The tightening body 22 has a head 21 pivotally connected at top, and a torque spring 24 fitted around the head 21 to control and keep a convex block 26 constantly pressing on the top of the upper plate 11. When the upper plate 11 and the lower plate 12 close together, the tightening member 2 is forced to swing up by rotation with the pivot 23 from the position shown in FIG. 3. When a handle 111 of the upper plate 11 moves to contact the convex block 26 and to push its convex surface 261, the convex block 26 is then moved outward. After the convex block 26 surpasses the handle 111 of the upper plate 11, the block 26 may swing back and press on the upper plate 11 owing to the elasticity of the spring 24. The spring 25 in the pivot hole is then compressed after the tightening member 2 is swung up, so the tightening member 2 produces force to swing down to recover its original position. Thus when the convex block 26 presses on the upper plate 11, the elasticity of the spring 25 coerces the upper and the lower plate 11 and 12 to close together tightly in the position shown in FIG. 1. In addition, the upper and the lower plate 11 and 12 can tightly press or sandwich meat of different thickness, thanks to the elasticity of the spring 25.

During the frying process, the upper plate 11 can automatically press tightly against the meat as it shrinks due to loss of fat and water. In this way, the constant pressing of the upper plate 11 against the meat being fried is very favorable for compelling fat to seep out of the meat. Moreover, meat being fried can also be heated in a balanced way, cooked to an ideal result and preserving its warmth.

Figure 5:
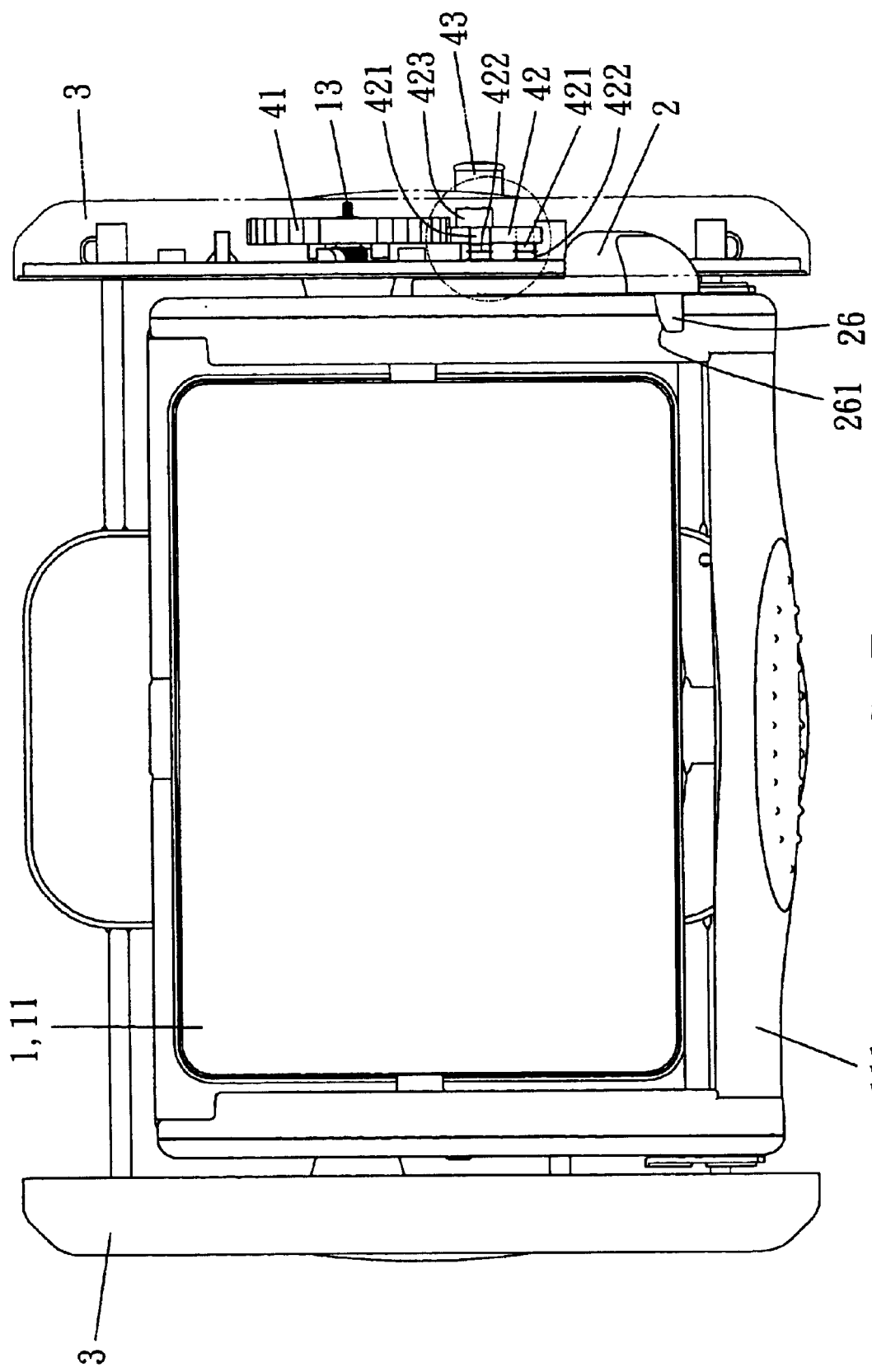
FIG. 5 is an upper view of FIG. 4.
Figure 6A:
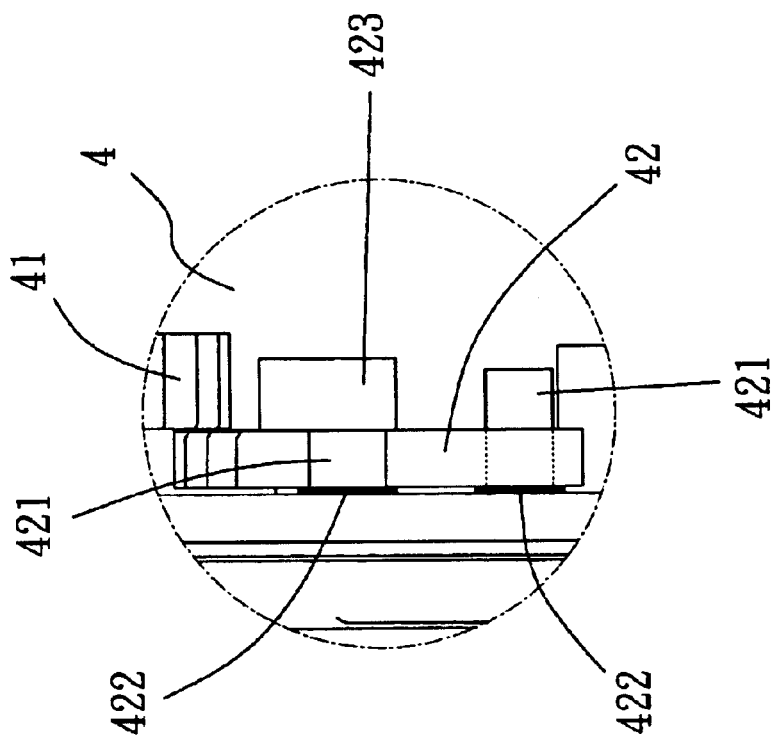
FIGS. 6a, 6b are side views of the position device in operating condition in the present invention; and, FIG. 7 is a side view of the fry pan swung up to an angle in the present invention.
Figure 6B:
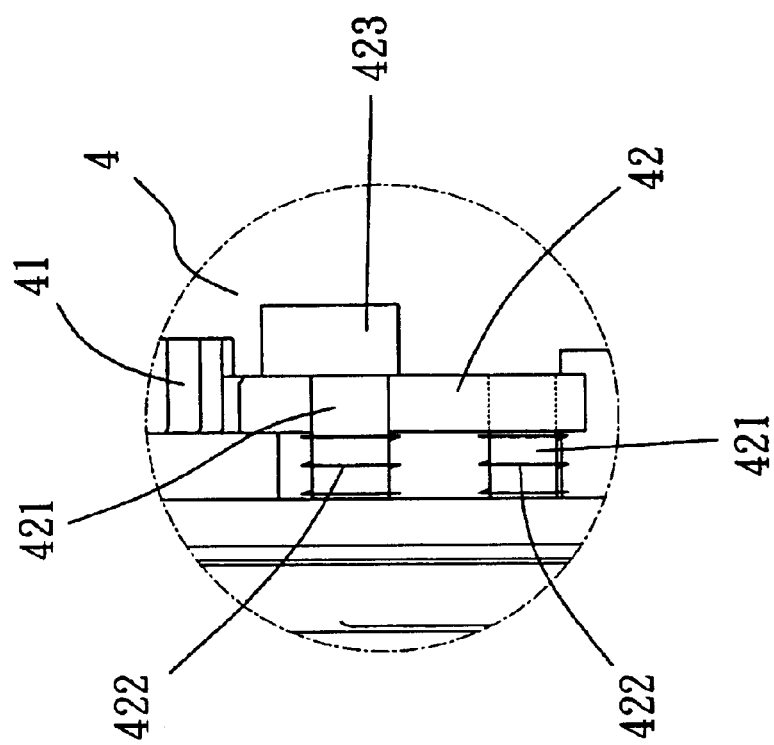
Figure 7:
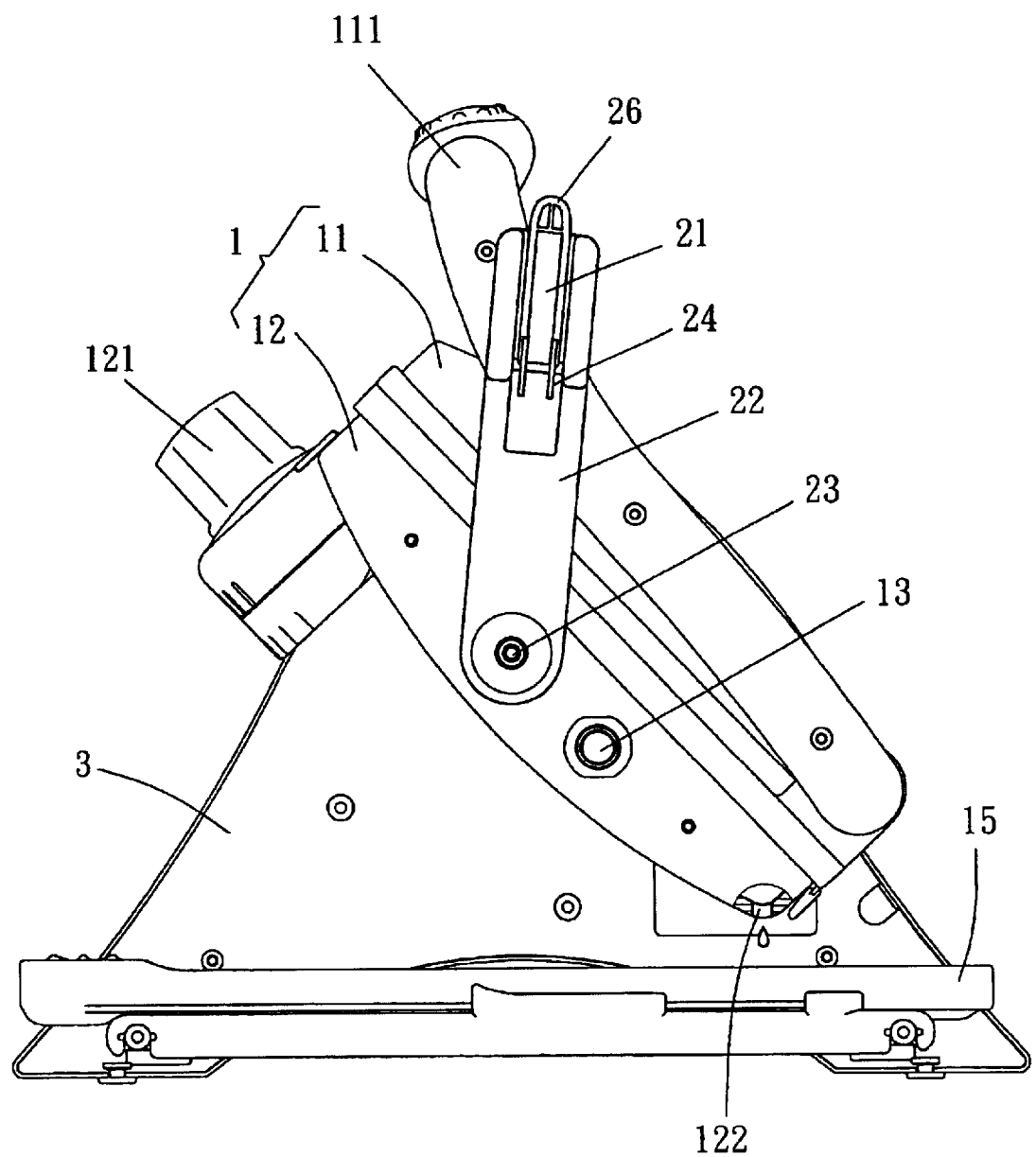

Next, the position device 4, as shown in FIG. 5, consists of a gear 41 and a pawl 42. The gear 41 is fixed firmly on the shaft 13 of the body 1, and located in the base 3, moving the body 1 synchronously by means of the shaft 13. The pawl 42 is shaped like a nail, having two ends provided with two shafts 421 eccentrically connected with the pawl 42 near one side of the gear 41 and the two shafts 421 respectively have a spring 422 fitting around to push outward the pawl 42 to engage with the gear 41 for tightening the body 1 immovable, as shown in FIGS. 5 and 6. One of the two shafts 421 has a press block 423 fixed on its outer end and connected with a press button 43 outside of the base 3. When the body 1 is needed to be adjusted in its position angle, as shown in FIG. 6*a*, press the press button 43 to push down the press block 423 as shown in FIG. 5 forcing the press block 423 compress the spring 422 of the pawl 42 to disengage from the gear 41 in the position that the body 1 is tightened, and swing the body 1 to a sloped angle needed as shown in FIG. 7. Then the spring 422 is in the compressed condition, and release the press button 43 as shown in FIG. 6*b*, to let the spring 422 recover its elasticity to push back the press block 423 to the original position shown in FIG. 6*b* and engage again with the gear 41 to tighten or lock the body 1 at the sloped angle adjusted.

Furthermore, the upper and the lower plate 11 and 12 are respectively provided with a heating device with a temperature controller. As the thickness of meat is not always the same, in frying, the meat may have upper and lower surfaces heated to different temperatures. Therefore, the embodiment of the invention has each of the upper and the lower plates 11 and 12 respectively provided with an independent heater with a temperature sensor to set a temperature for controlling the heat of the upper and the lower plate 11 and 12 at the same time instead of the single one side temperature controller used in the conventional fry pan. Then the meat can be fried uniformally in the two upper and lower surfaces to make it delicious.

While the preferred embodiment of the invention has been described above, it will be recognized and understood that various modifications may be made therein and the appended claims are intended to cover all such modifications that may fall within the spirit and scope of the invention.

What is claimed is:

1. A fry pan having an adjustable position angle comprising:
   a) a base;
   b) a shaft;
   c) a body pivotally connected to the base by the shaft, the body including an upper plate and a lower plate;
   d) a tightening member securing the upper and lower plates together for accommodating food products of different thicknesses disposed therebetween; and
   e) a positioning device permitting the position angle of the body to be varied through pivoting of the body about the shaft and maintaining the body in a desired position angle.

2. The fry pan of claim 1, wherein the position device includes:
   a) a gear secured on the shaft and rotatable therewith during pivoting of the body;
   b) a pawl secured on a side wall of the base and positioned at a side of the gear, the pawl including a plurality of teeth for engaging the gear when the pawl is urged outwardly by a pair of springs for immobilizing the gear and the body; and
   c) the body being permitted to vary its position angle through compression of the springs to disengage the pawl from the gear.

3. The fry pan of claim 1, wherein the tightening member includes:
   a) an elongate body having a first end and a second end;
   b) the first end of the elongate body being pivotally connected to the lower plate and including a first torque spring for urging the body in a downward direction; and
   c) the second end of the elongate body including a pivotal head having a convex block thereon, and a second torque spring urging the convex block against the top of the upper plate.

4. The fry pan of claim 1, wherein the upper and the lower plates are each provided with a heater and a temperature controller.

* * * * *